United States Patent
Kuniya et al.

(10) Patent No.: US 9,728,752 B2
(45) Date of Patent: Aug. 8, 2017

(54) ALKALINE BATTERY INCLUDING CATHODE CAN WITH COATING COMPOSED OF NICKEL-COBALT ALLOY

(75) Inventors: Shigeyuki Kuniya, Kosai (JP); Yoshiaki Ishitani, Kosai (JP)

(73) Assignee: FDK Energy Co., Ltd., Kosai-shi, Shizuoka (JP)

( * ) Notice: Subject to any disclaimer, the term of this patent is extended or adjusted under 35 U.S.C. 154(b) by 648 days.

(21) Appl. No.: 13/818,475

(22) PCT Filed: Jul. 27, 2011

(86) PCT No.: PCT/JP2011/067093
§ 371 (c)(1),
(2), (4) Date: Apr. 3, 2013

(87) PCT Pub. No.: WO2012/026269
PCT Pub. Date: Mar. 1, 2012

(65) Prior Publication Data
US 2013/0209864 A1 Aug. 15, 2013

(30) Foreign Application Priority Data
Aug. 26, 2010 (JP) .................. 2010-189769

(51) Int. Cl.
*H01M 2/02* (2006.01)
*H01M 6/08* (2006.01)

(52) U.S. Cl.
CPC ......... *H01M 2/0257* (2013.01); *H01M 2/026* (2013.01); *H01M 2/0235* (2013.01);
(Continued)

(58) Field of Classification Search
CPC .... H01M 10/24–10/32; H01M 2/0287; H01M 2/0292; H01M 2/027; H01M 2/0272; H01M 2/0285
See application file for complete search history.

(56) References Cited

U.S. PATENT DOCUMENTS

| 4,760,002 A | 7/1988 | Schneider et al. |
| 6,087,040 A * | 7/2000 | Ohmura .............. C25D 3/562 429/163 |

(Continued)

FOREIGN PATENT DOCUMENTS

| JP | 07-070320 B2 | 7/1995 |
| JP | 9-312150 A | 12/1997 |

(Continued)

OTHER PUBLICATIONS

Notification of Reasons for Rejection, Japanese Patent Application No. 2010-189769, Apr. 8, 2014.
(Continued)

*Primary Examiner* — Barbara Gilliam
*Assistant Examiner* — Robert S Carrico
(74) *Attorney, Agent, or Firm* — Harness, Dickey & Pierce, P.L.C.

(57) ABSTRACT

There is provided An inside-out alkaline battery, including: a cylindrical cathode can that has a bottom, that performs a function of a cathode current collector, that has a nickel-plated layer on an inner surface of the cathode can, and that has a coating on a surface layer of the nickel-plated layer, the coating being composed of nickel-cobalt alloy, a thickness of the coating being between 0.15 μm and 0.25 μm (both inclusive), a ratio of cobalt in the nickel-cobalt alloy being between 40% and 60% (both inclusive); and a cathode mixture that is disposed in the cathode can, that is annular in shape, and that contains a cathode active material.

2 Claims, 2 Drawing Sheets

(52) U.S. Cl.
CPC ....... *H01M 2/0272* (2013.01); *H01M 2/0285* (2013.01); *H01M 2/0287* (2013.01); *H01M 6/08* (2013.01); *H01M 6/085* (2013.01)

(56) References Cited

U.S. PATENT DOCUMENTS

| | | | |
|---|---|---|---|
| 6,586,907 B1* | 7/2003 | Mori et al. | 320/107 |
| 2008/0001571 A1 | 1/2008 | Tomigashi | |
| 2008/0292957 A1* | 11/2008 | Tomomori et al. | 429/176 |
| 2009/0053595 A1 | 2/2009 | Izumi et al. | |

FOREIGN PATENT DOCUMENTS

| | | | |
|---|---|---|---|
| JP | 10-172521 A | | 6/1998 |
| JP | 10172521 A | * | 6/1998 |
| JP | 2005-149735 A | | 6/2005 |
| JP | 2006-55382 A | | 3/2006 |
| JP | 2008-034375 A | | 2/2008 |
| WO | WO-00/65671 A1 | | 11/2000 |

OTHER PUBLICATIONS

First Office Action, Chinese Patent Application No. 201180041069.3, Nov. 2, 2014.

\* cited by examiner

ALKALINE BATTERY INCLUDING CATHODE CAN WITH COATING COMPOSED OF NICKEL-COBALT ALLOY

CROSS-REFERENCE TO RELATED APPLICATIONS

This application is a 371 U.S. National Stage of International Application No. PCT/JP2011/067093, filed Jul. 27, 2011, which claims priority to Japanese Patent Application No. 2010-189769, filed Aug. 26, 2010. The disclosures of the above applications are incorporated herein by reference.

TECHNICAL FIELD

The invention relates to an alkaline battery, particular to an alkaline battery which has low environmental impact at manufacturing and can increase its productivity.

BACKGROUND ART

FIG. 1 shows a common configuration of alkaline batteries. The illustrated alkaline battery is an LR14 alkaline battery 1 having a cylindrical shape; FIG. 1(A) is a longitudinal sectional view in which the direction of the cylinder axis 10 is a longitudinal direction, and FIG. 1(B) is a magnified view of a circle 100 in FIG. 1(A). The alkaline battery 1 has a so-called inside-out construction. The alkaline battery 1 includes: a cylindrical cell can (cathode can) 2 which is made of metal and has a bottom; a cathode mixture 3 which is annular in shape; a cylindrical separator 4 which is disposed inside the cathode mixture 3 and has a bottom; an anode gel 5 which contains zinc alloy and fills the separator 4; an anode electron collector 6 inserted into the anode gel 5; a negative plate 7; a sealing gasket 8; and the like. In this configuration, the cathode mixture 3, the separator 4, and the anode gel 5 serve as active parts of the alkaline battery 1 in the presence of an electrolytic solution. The inner surface of the cathode can 2 is exposed to a strong alkaline electrolytic solution. Therefore, as shown in the magnified view of FIG. 1(B), a substrate of the cathode can 2 is a steel sheet 21 on which a nickel-plated layer 22 of approximately 0.6-1.0 μm thickness is formed. Thus, the nickel-plated layer 22 on at least the inner surface side of the cathode can 2 prevents iron that constitutes the steel sheet 21 from being corroded by the strong alkaline electrolytic solution.

The cathode can 2 which also serves as a cell case has a positive terminal 9 on the bottom face thereof. The inner surface of the cathode can 2 is in direct contact with the cathode mixture 3, which enables the cathode can 2 to function as a cathode current collector. Therefore, it is necessary to lower as much as possible a contact resistance between the cathode can 2 and the cathode mixture 3. In order to lower further the contact resistance, an electro-conductive film 23 to which an electro-conductive paint is applied is generally formed on the inner surface of the cathode can 2.

The following [PTL 1] describes a technique which for maintaining low contact resistance for a long time by forming on the inner surface side of a cathode can a coating which contains elemental Co or cobalt compound.

CITATION LIST

Patent Literature

[PTL 1] Japanese Examined Patent Publication No. 7-70320

SUMMARY OF THE INVENTION

Technical Problem

As mentioned above, in an inside-out alkaline battery, it is necessary to lower as much as possible a contact resistance between the cathode can 2 and the cathode mixture 3. Though the electro-conductive film is an effective technique for lowering the contact resistance, an electro-conductive paint which is applied to the inner surface of the cathode can for forming the electro-conductive film is obtained by dispersing or dissolving an electro-conductive substance into any Volatile Organic Compound (VOC) such as MEK. The emissions of VOCs are being restricted in recent years. In addition thereto, in view of environmental issues, it is desirable to omit a coating process of the electro-conductive paint.

In view of the above VOC problems, an electro-conductive paint in which water is used as solvent can replace the VOC. However, in this case, water which is the solvent does not evaporate naturally. Therefore, following the coating process of the electro-conductive paint, a drying process is required for removing water which is the solvent. In this drying process, extra energy and time are consumed, which results in decreasing productivities for the alkaline battery. Further, increase of energy consumption is contrary to the world demand for $CO_2$ emission reduction and is not desirable in view of environmental issues. However, a simple omission of the electro-conductive film cannot achieve a sufficiently low contact resistance. Further, nickel-plated coating formed on the inner surface of the cathode can has a problem that its direct contact to the cathode mixture causes oxidation of the nickel-plated coating and that long-term storage further increases its contact resistance.

Therefore, it can be considered that a coating containing elemental Co or cobalt compound is formed on the inner surface of the cathode can in a similar manner to techniques described in [PTL 1]. However, while the literature describes a method for forming various Co-containing coatings, the literature actually discloses only a technique employing a metal alloy of Fe, Ni, and Co (Vacon 10) as a Co-containing coating. Indeed, since oxides of cobalt dissolve in an alkaline electrolyte, the oxides of cobalt are less likely to increase the contact resistance, as opposed to oxides of nickel. However, as a result of studies by the inventers, it is recognized that placing Co-containing substance on the inner surface of the cathode can causes various problems such as not being able to sufficiently lower the contact resistance and deterioration of the discharge performance after long-term storage, unless various chemical reactions inside the alkaline battery are considered sufficiently.

The invention has been made in view of the foregoing recognition and an advantage thereof is to provide an alkaline battery which has excellent battery performance and can reduce environmental impacts.

Solution to Problem

An aspect of the invention to achieve the above advantage is an inside-out alkaline battery, including:

a cylindrical cathode can
   that has a bottom,
   that performs a function of a cathode current collector,
   that has a nickel-plated layer on an inner surface of the cathode can, and
   that has a coating on a surface layer of the nickel-plated layer,
      the coating being composed of nickel-cobalt alloy,
      a thickness of the coating being between 0.15 μm and 0.25 μm (both inclusive),
      a ratio of cobalt in the nickel-cobalt alloy being between 40% and 60% (both inclusive); and
a cathode mixture
   that is disposed in the cathode can,
   that is annular in shape, and
   that contains a cathode active material.

Further, it is more preferable that the inner surface of the cylindrical cathode can has a roughness Ra value between 1.0 μm and 1.5 μm (both inclusive) in a circumferential direction.

Effects of the Invention

With an alkaline battery according to the invention, it is possible to reduce environmental impacts while maintaining a contact resistance between a cathode mixture and the inner surface of a cathode can and battery performance such as long storage life. Effects of the invention other than the above will become clear by the description hereinbelow.

MODE FOR CARRYING OUT THE INVENTION

At least the following matters will be made clear by the description in the present specification and the accompanying drawings.

Embodiments According to the Invention

Figure 1:
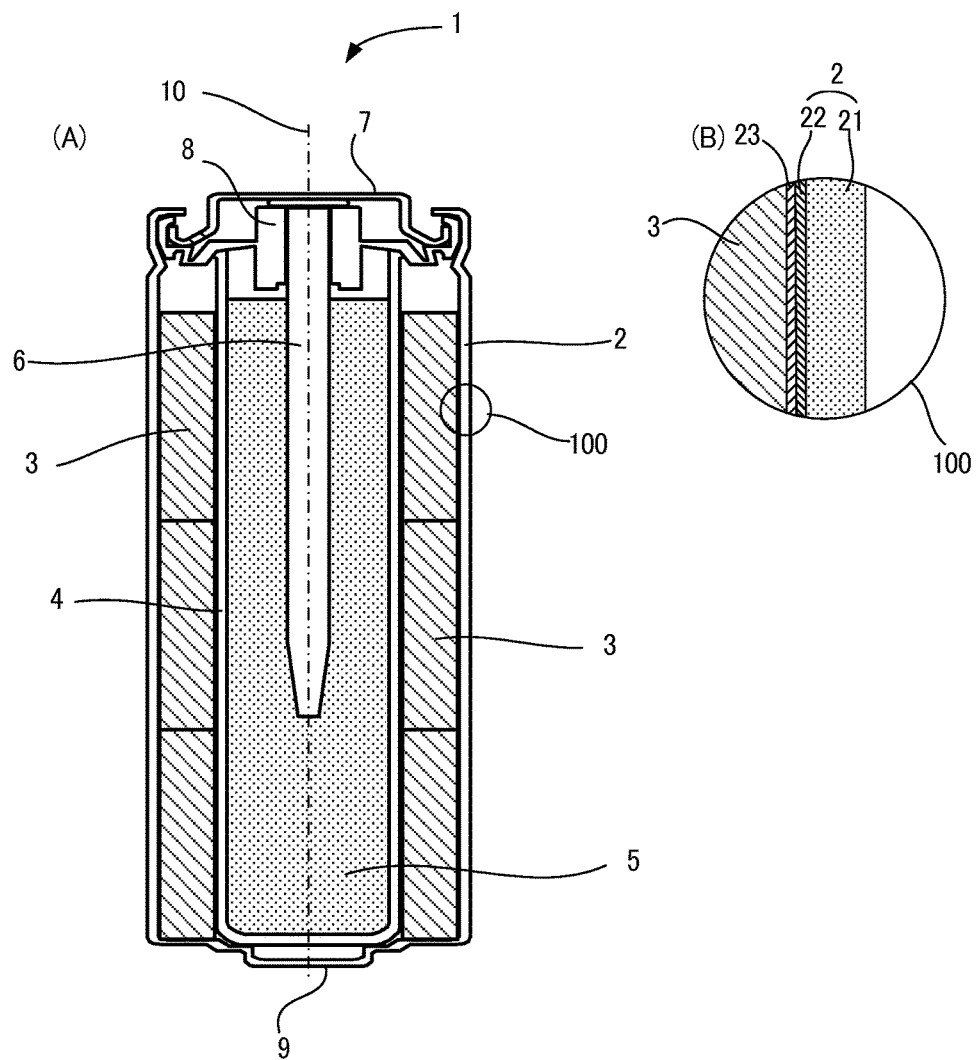
FIG. 1 is a diagram showing the configuration of a common alkaline battery.
Figure 2:
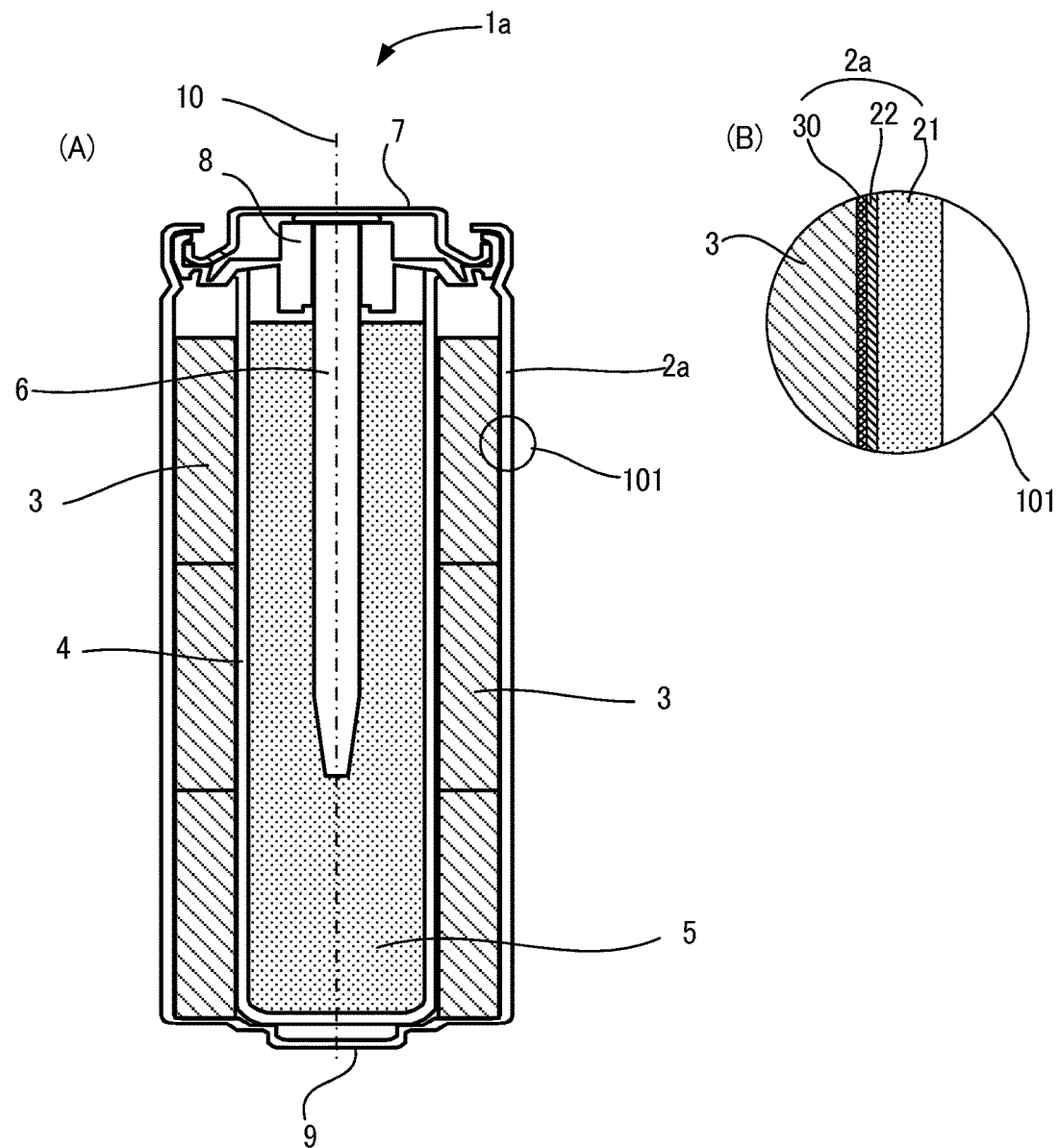
FIG. 2 is a diagram showing the configuration of an alkaline battery of the embodiments according to the invention.

FIG. 2 shows the configuration of an alkaline battery 1a of the embodiments according to the invention. FIG. 2(A) is a longitudinal sectional view of the alkaline battery, and FIG. 2(B) is a magnified view of a circle 101 in FIG. 2(A). Though the basic configuration of the alkaline battery 1a is the same as a common alkaline battery 1 shown in FIG. 1, a cathode can 2a of the alkaline battery 1a of this embodiment is different in configuration from a conventional one. As shown in FIG. 2(B), the inner surface of the cathode can 2a does not have the electro-conductive film 23; but, instead of the electro-conductive film 23, a coating layer 30 of nickel-cobalt (Ni—Co) alloy is formed by electroplating on the surface layer of a nickel-plated layer 22 of the substrate of the cathode can 2a; the coating layer 30 contains nickel and cobalt with an inevitable mixing of impurities. However, even if the coating layer of Ni—Co alloy (Ni—Co layer) 30 is merely formed on the inner surface of the cathode can 2a, considering various chemical reaction inside the alkaline battery 1a is required to sufficiently realize battery performance. Therefore, without appropriate setting of various conditions of the Ni—Co alloy layer 30 (i.e., layer thickness and the ratio of Ni and Co in the alloy), it would be impossible to retain the contact-resistance-related performances at an initial stage of use and after long-term storage at around the same level as the conventional alkaline battery 1.

A conventional alkaline battery 1 and various alkaline batteries 1a that are different in conditions of the Ni—Co alloy layer 30 were prepared as samples. With evaluation of characteristics of these samples, optimal conditions of Ni—Co alloy layer were found. It should be noted that the cathode cans (2 and 2a) used for the samples all have a substrate of a steel sheet on the surface layer of which the nickel-plated layer 22 of 1.0 μm thickness is formed. Thus, the samples are made using the cathode cans (2, 2a) in which the electro-conductive film 23 or the Ni—Co layer 30 is formed on the foregoing surface layer of the nickel-plated layer 22 of the substrate. All of the samples are LR14 in size.

First Embodiment

The first embodiment according to the invention is the alkaline battery 1a in which the Ni—Co alloy layer 30 is disposed on the inner surface of the cathode can 2a and various conditions of the Ni—Co alloy layer 30 are optimized. The section below describes methods and results of tests which were performed in order to find optimal conditions for the Ni—Co alloy layer 30 of the alkaline battery 1a of the first embodiment.

Preliminary Consideration

Three types of LR14 alkaline battery were prepared as samples for confirming a contact resistance lowering effect caused by using the cathode can 2a which includes the Ni—Co alloy layer 30 as the inner surface of the cathode can 2a.

Conditions of the inner surface of the cathode can of each sample is shown in Table 1 below.

TABLE 1

| Sample | Electro-conductive film | Ni—Co alloy layer |
|---|---|---|
| s1 (conventional example) | ○ | x |
| s2 | x | x |
| s3 (this invention) | x | ○ |

Every one of Samples s1-s3 in Table 1 is an alkaline battery including the cathode can 2 configured by a substrate in which the nickel-plated layer 22 having a thickness of 1.0 μm is formed. Sample s1 is a conventional alkaline battery 1 in which the inner surface of cathode can 2 has the electro-conductive film 23 (hereinafter referred to as, conventional example). Sample s2 is the one that has the cathode can 2 with no electro-conductive film, as opposed to the conventional example. Sample s3 is the alkaline battery 1a in which the cathode can 2a with the Ni—Co alloy layer 30 is used instead of a cathode can with the electro-conductive film 23. In Sample s3, the ratio of Co to Ni—Co alloy is 40%, and the thickness of the alloy layer is 0.20 μm.

Next, discharge performances of batteries of the foregoing samples s1-s3 were evaluated with intermittent discharge tests. The intermittent discharge tests are performed by measuring discharge duration to the end voltage under a condition that a cycle is repeated in which a battery discharges for a given period of time per day at a constant current or at a constant load and a battery is left under no-load conditions for the remaining period of time during which the battery does not discharge. In this example, time (h) required for each sample to discharge to end voltage (i.e., 0.9 V) is evaluated by performing the following three tests: a battery discharges for 2 hours per day at the rate of 400 mA (constant-current intermittent discharge); a battery discharges for 1 hours per day at a load of 3.9Ω (light intermittent discharge); and a battery discharges for 4 hours per day at a load of 20Ω (heavy intermittent discharge). Further, for each of these 3 types of samples, the following two samples were prepared: a sample for evaluating its initial performance, which is tested immediately after its assembly; and a sample for evaluating a performance after long-term storage, which is tested after accelerated deterioration by leaving the sample for 20 days in an environment of 60° C., which realizes conditions after long-term storage. These discharge tests are performed at 20° C.

The test result is shown in Table 2 below.

TABLE 2

| Sample | Discharge duration (h) | | | | | |
|---|---|---|---|---|---|---|
| | 400 mA 2 h/day | | 3.9Ω 1 h/day | | 20Ω 4 h/day | |
| | Initial characteristic | 60° C. 20 days | Initial characteristic | 60° C. 20 days | Initial characteristic | 60° C. 20 days |
| s1 | 12.8 | 11.5 | 21.7 | 21.2 | 119.3 | 115.5 |
| s2 | 3.6 | 0.1 | 16.7 | 13.2 | 110.2 | 108.3 |
| s3 | 13.2 | 11.3 | 21.5 | 21.2 | 119.5 | 116.3 |

As shown in Table 2, comparing Samples s1 and s2 both of which include the cathode can 2 with no Ni—Co alloy layer 30, Sample s2 with no electro-conductive film 23 is inferior to Sample s1 of the conventional example in initial characteristic and characteristics after long-term storage for all the tests. Particularly, in the constant-current intermittent discharge test, performance ratios of Sample s2 to conventional example s1 is 30% in initial characteristic and 1% in characteristic after long-term storage. On the other hand, Sample s3 with the Ni—Co alloy layer 30 has a performance comparable to the conventional example s1. Thus, it has been confirmed that it is possible to omit the electro-conductive film 23 by using the cathode can 2a in which the Ni—Co alloy layer 30 is additionally provided on the surface layer of nickel-plated layer 22.

The reason can be considered as follows: an oxide of Co is easy to dissolve in an electrolytic solution (alkaline solution); and therefore, even if Co contained in the Ni—Co alloy layer 30 is oxidized by manganese dioxide of the cathode mixture 3 (strong oxidizer), the dissolving of the oxide layer itself suppresses increase of the contact resistance.

Thickness of Ni—Co Alloy Layer

Next, evaluated is a correlation between the thickness of the Ni—Co alloy layer 30 and discharge performance, and find an appropriate layer thickness of the Ni—Co alloy layer 30. For these purposes, various samples were prepared which had different layer thickness of the Ni—Co alloy layer but have the same ratio of 40% of Co to Ni—Co alloy as the foregoing Sample s3. Further, in the same way as the preliminary consideration, prepared were the following two groups of samples: a sample group to be tested immediately after its assembly; and a sample group to be tested after long-term storage. Also, for each sample group, the constant-current intermittent discharge test and the light intermittent discharge test were performed.

Table 3 shows the relationship between layer thickness of the Ni—Co alloy layer 30 and discharge performance.

TABLE 3

| Sample | Ni—Co alloy layer thickness (μm) | Discharge duration (h) | | | |
|---|---|---|---|---|---|
| | | 400 mA 2 h/day | | 3.9Ω 1 h/day | |
| | | Initial characteristic | 60° C. 20 days | Initial characteristic | 60° C. 20 days |
| s4 | 0.14 | 12.9 | 10.3 | 21.1 | 20.8 |
| s5 | 0.15 | 13.1 | 11.1 | 21.3 | 21.0 |
| s6 | 0.20 | 13.2 | 11.3 | 21.5 | 21.2 |
| s7 | 0.25 | 13.2 | 11.3 | 21.4 | 21.1 |
| s8 | 0.26 | 12.8 | 10.4 | 21.2 | 20.9 |

As shown in Table 3, it is confirmed that, for Sample s4 with the Ni—Co alloy layer 30 having a layer thickness less than 0.15 μm and Sample s8 with the layer having a layer thickness more than 0.25 μm, long-term storage capability deteriorates in the constant-current intermittent discharge test. Further, the initial characteristics of discharge duration are equal to or less than 13.0 h, and the initial characteristics in the constant-current intermittent discharge test are also inferior to the other samples s5-s7. The reason can be considered as follows: a thin Ni—Co alloy layer 30 leads to the lack of the absolute amount of Co so that it becomes impossible to suppress the increase of contact resistance caused by oxidation of nickel in the alloy; on the other hand, a extremely-thick Ni—Co alloy layer 30 increases resistance of the alloy itself so that characteristics deteriorate in the constant-current discharge test. Therefore, the appropriate layer thickness of the Ni—Co alloy layer 30 was found to be between 0.15 μm and 0.25 μm (both inclusive).

Ni—Co Alloy Ratio: Upper Limit Ratio of Co

As mentioned above, it is confirmed that the appropriate layer thickness of the Ni—Co alloy layer 30 exists. Incidentally, Co in Ni—Co alloy is less likely to be ionized comparing to elemental Co, and therefore, Co is less likely to dissolve into the electrolytic solution. However, if the ratio of Co to the alloy is high, there is a possibility that Co dissolves in the electrolytic solution. If Co dissolves in the electrolytic solution, the ionized Co is deposited at the negative electrode, corrodes zinc of anode mixtures, and produces gas. Gassing may cause leakage of the cell. Therefore, it is necessary to find the appropriate ratio of Co to Ni in the alloy.

Substrates of the cathode can 2a which have an area of a predetermined size were prepared. The surface layers of the nickel-plated layers 22 of the substrates were coated with the Ni—Co alloy layers 30 by plating; the Ni—Co alloy layer 30 on each substrate were different in the ratio of Co to Ni. Each substrate which had the area of the predetermined size and was coated with the Ni—Co alloy layer 30 was immersed in KOH, which is the electrolytic solution of the alkaline batteries (1, 1a). Since Ni in the substrates and Ni—Co alloy is resistant to alkalis, the decrease per unit area in weight after the immersion was obtained as a dissolving amount of Co. The immersion into KOH was performed for 10 days at solution temperature of 60° C.

Table 4 shows a relationship between ratios of Co to Ni—Co alloy and amounts of Co (g/m$^2$) before and after immersion into KOH.

TABLE 4

| Ratio of Co (%) | Amount of Co (g/m²) | |
| --- | --- | --- |
| | Before KOH immersion | After KOH immersion (60° C., 10 days) |
| 0 | 0.00 | 0.00 |
| 35 | 0.70 | 0.70 |
| 39 | 0.78 | 0.78 |
| 40 | 0.80 | 0.80 |
| 45 | 0.90 | 0.90 |
| 50 | 1.00 | 1.00 |
| 55 | 1.10 | 1.10 |
| 60 | 1.20 | 1.20 |
| 61 | 1.22 | 1.11 |
| 65 | 1.30 | 1.06 |
| 70 | 1.40 | 0.80 |
| 80 | 1.60 | 0.60 |

In Table 4, weights of Co alone in the Ni—Co alloy coating are calculated based on the weights of the substrates which have the area of the predetermined size and are plated by the Ni—Co alloy, and the ratio of Co to Ni—Co alloy. As shown in Table 4, it is confirmed that Co dissolves if the ratio of Co to Ni—Co alloy is larger than 60%. That is, it is confirmed that, if the ratio of Co to Ni—Co alloy is 60% or less, Ni—Co alloy is stabilized. Consequently, it is necessary for the ratio of Co in the Ni—Co alloy layer 30 to be 60% or less.

Ni—Co Alloy Ratio: Lower Limit Ratio of Co

As mentioned above, it is confirmed that the upper limit ratio of Co in the Ni—Co alloy layer 30 exists. On the other hand, concerning the lower limit ratio of Co, there is a risk as follows: lowering the ratio of Co increases the ratio of Ni in the inner surface of the cathode can 2a, which results in a risk that Ni oxidized by the electrolytic solution increases the contact resistance. In order to find the lower limit ratio of Co, prepared were, as samples, various alkaline batteries 1a in which the inner surfaces of the cathode cans 2a include the Ni—Co alloy layer 30 having different ratios of Co. Each of the samples underwent the constant-current intermittent discharge test and the light intermittent discharge test, and its initial characteristic and long-term storage capability were evaluated. The thickness of the Ni—Co alloy layer 30 is 0.20 μm.

The evaluation result is shown in Table 5.

TABLE 5

| | | Discharge duration (h) | | | |
| --- | --- | --- | --- | --- | --- |
| | | 400 mA 2 h/day | | 3.9Ω 1 h/day | |
| Sample | Ratio of Co (%) | Initial characteristic | 60° C. 20 days | Initial characteristic | 60° C. 20 days |
| s9 | 20 | 13.1 | 8.3 | 21.3 | 16.7 |
| s10 | 30 | 13.2 | 9.9 | 21.5 | 18.2 |
| s11 | 39 | 13.2 | 10.7 | 21.4 | 20.2 |
| s12 | 40 | 13.2 | 11.3 | 21.5 | 21.2 |

As shown in Table 5, it is confirmed that long-term storage capability of Samples s9-s11 deteriorates in which the ratio of Co is less than 40%. Therefore, it is necessary for the ratio of Co in the Ni—Co alloy layer 30 to be 40% or more. That is, considering the foregoing upper limit ratio, it is found that the ratio of Co in the Ni—Co alloy layer 30 is between 40% and 60% (both inclusive).

Consequently, the alkaline battery 1a of the first embodiment according to the invention is an alkaline battery whose cathode can 2 has a substrate of a steel sheet including a nickel-plated layer formed thereon, and in which a layer plated by Ni—Co alloy is formed on the surface layer of the nickel-plated layer of the inner surface of the cathode can 2. The thickness of the Ni—Co-alloy-plated layer is between 0.15 μm and 0.25 μm (both inclusive), and the ratio of Co in the Ni—Co-alloy-plated layer is between 40% and 60% (both inclusive).

The alkaline battery of the first embodiment does not have an electro-conductive film on the inner surface of the cathode can 2, but its contact resistance between the cathode can and the cathode mixture does not increase. That is, the alkaline battery of the first embodiment has discharge performance as much as conventional alkaline batteries. Therefore, the alkaline battery makes it possible to reduce environmental impacts while maintaining the battery performance of the battery. In this embodiment, the Co-containing coating is Ni—Co alloy that contains substantially only Ni and Co. A method for forming the Co-containing coating is as follows: preparing as a substrate a nickel-plated steel sheet which is commonly used as the cathode can 2 of the common alkaline battery 1; and plating Ni—Co alloy onto the surface of the substrate. Alloying like for example Vacon 10 is not employed in which Co is mixed with Ni and Fe contained in the substrate of the cathode can 2. Consequently, the cathode can 2a used in the alkaline battery 1a of the first embodiment can be manufactured easily because the cathode can 2a can be manufactured by means such as multistage deep drawing of the substrate that is plated by Ni—Co alloy. Further, the alkaline battery 1a of the first embodiment can be manufactured without significant increase of costs because procurement of the substrate itself is easy. Since omitting processes for forming materials of the electro-conductive film 23 and the film 23 itself will reduce costs, the alkaline battery 1 can achieve a manufacturing cost equal to or lower than conventional alkaline batteries.

Second Embodiment

An alkaline battery according to the second embodiment of the invention has the same configuration as the alkaline battery 1a of the first embodiment. Therefore, the alkaline battery 1a of the second embodiment will be described below using the symbols of FIG. 2.

The foregoing embodiment according to this invention is the alkaline battery in which Ni—Co alloy layer is disposed on the inner surface of the cathode can 2 and various conditions of the Ni—Co alloy layer are optimized. In addition, the alkaline battery can reduce environmental impacts and also has performance comparable to conventional alkaline battery 1 in which the inner surface of cathode can 2 has the electro-conductive film 23. On the other hand, the alkaline battery 1a of the second embodiment according to this invention is the alkaline battery that includes the Ni—Co alloy layer 30 whose various conditions are optimized and in which its cathode can 2a has an optimized physical configuration.

Specifically, the cell can of a cylindrical cell, such as the cathode can 2a of the alkaline battery 1a, is generally formed by multistage deep drawing. Adjusting an ironing die R at the time of multistage deep drawing makes it possible to control the surface roughness of the inner surface of the cylindrical cathode can in a circumferential direction. The controlling of the roughness can increase contact area of the cathode mixture 3 with the inner surface of the cathode can 2a and can lower the contact resistance. Prepared were various samples having respective cathode cans 2a; the cathode cans 2a each include the Ni—Co alloy layer 30 on the inner surface thereof and have different roughness of the inner surface in the circumferential direction (hereinafter referred to as an inner surface roughness). And, the discharge performance thereof was evaluated. In all of the evaluated samples, the thickness of the Ni—Co alloy layer 30 is 0.20 μm, and the ratio of Co in the alloy is 40%. As an index of the roughness, Ra value is used.

Table 6 shows a relationship between the inner surface roughness of the cathode can 2 and the discharge characteristics of each sample. It should be noted that, in the alkaline battery 1a according to the embodiments of the invention, various conditions (physical properties) of Ni—Co alloy and the layer 30 plated by Ni—Co alloy are defined in the first embodiment. On the other hand, the second embodiment defines the inner surface roughness, which is a physical configuration. Therefore, in the section below, the discharge performances are evaluates by initial characteristic in the constant-current intermittent discharge test.

TABLE 6

| Sample | Roughness Ra (μm) | Discharge duration (h) 400 mA 2 h/day Initial characteristic |
|---|---|---|
| s13 | 0.9 | 12.5 |
| s14 | 1.0 | 13.2 |
| s15 | 1.1 | 13.3 |
| s16 | 1.3 | 13.3 |
| s17 | 1.5 | 13.4 |

As shown in Table 6, in the samples s14-s17, the inner surfaces of the cathode cans 2a have roughness Ra values of 1.0 μm or more in the circumferential direction; the samples s14-s17 have excellent initial characteristics in the constant-current intermittent discharge. Thus, it can be considered that good electrical and physical contact was achieved in these samples. In deep drawing, it is experientially known that it is difficult to obtain a surface roughness Ra value greater than 1.5 μm. Therefore, it is desirable that the inner surface of the cathode can 2a has the average roughness Ra value between 1.0 μm and 1.5 μm (both inclusive) in circumferential direction.

REFERENCE SIGNS LIST 1 conventional alkaline battery, 1a alkaline battery of the embodiment according to the invention,
2,2a cell can (cathode can), 3 cathode mixture, 4 separator, 5 anode gel,
6 anode electron collector, 7 negative plate, 8 gasket, 9 positive terminal, 21 steel sheet,
22 nickel-plated layer, 23 electro-conductive film, 30 Ni—Co alloy layer

The invention claimed is:
1. An inside-out alkaline battery, comprising:
a cylindrical cathode can
that has a bottom,
that performs a function of a cathode current collector,
that uses a can formed by multistage deep drawing of a steel sheet, the steel sheet including a nickel-plated layer having a thickness of 1.0 μm,
that does not include an electro-conductive paint in which volatile organic compound or water is used as solvent being applied to an inner surface of the cathode can,
that has the nickel-plated layer on the inner surface of the cathode can, and
that has a coating on a surface layer of the nickel-plated layer,
the coating being composed of nickel-cobalt alloy that contains only nickel-cobalt alloy,
a thickness of the coating being between 0.15 μm and 0.25 μm (both inclusive),
a ratio of cobalt in the nickel-cobalt alloy being between 40% and 60% (both inclusive); and
a cathode mixture
that is disposed in the cathode can,
that is annular in shape, and
that contains a cathode active material.
2. An alkaline battery according to claim 1, wherein the inner surface of the cylindrical cathode can has a roughness Ra value between 1.0 μm and 1.5 μm (both inclusive) in a circumferential direction.

* * * * *